6490X
J. Johnson,
Fire Escape,
Patented Apr. 18, 1831
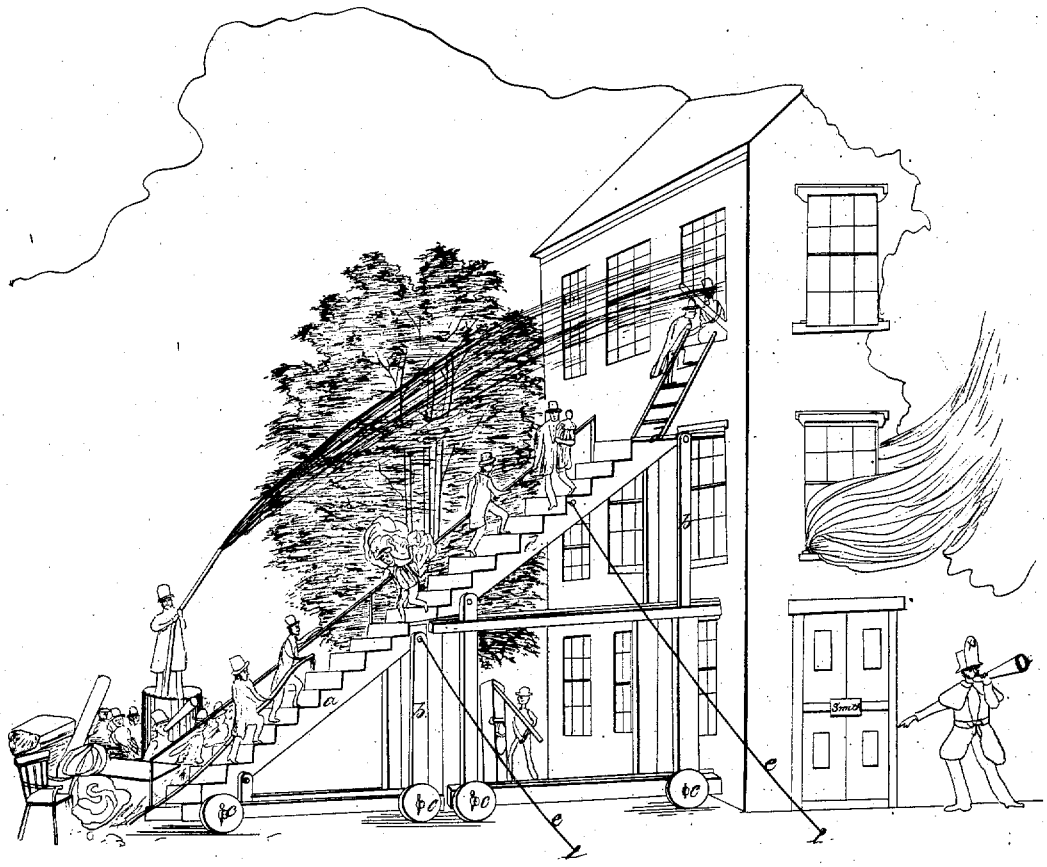
N. PETERS, PHOTO-LITHOGRAPHER, WASHINGTON D. C.

[illegible] 18. [illegible]

James Johnson, of Baltimore, Md
Letters Patent -

6490X

The schedule referred to in these Letters Patent and making part of the same, containing a description in the words of the said James Johnson himself of his improvement called, "The Life Escape and fire Ladder." -

---

To all to whom these present shall come. Be it known that I James Johnson of the City of Baltimore in the County of Baltimore and State of Maryland have invented a new and useful improvement in the machine for facilitating the escape of persons from buildings on fire, called the escape and fire ladder and that the following is a full and exact description of the construction and operation of the said machine as invented by me.

This machine consists of a platform placed on wheels for moving it speedily from place to place on which are erected steps laying horizontally and from which it can be elevated in a moment to the height calculated and made stationary when arrived at the point desired by props resting on the platform and stays of ropes fastened to iron pins drove into the ground. a second platform is erected on a level with the top of the elevation of the first ladder or steps, has steps similar to the first, is raised and stayed in the same manner and on the top is placed or fixed a stand for one or more persons to occupy and direct the water poured from the hose in a horizontal or inclined line which will have the effect of saving three fourths or one half of the water in the manner now used and more speedily extinguishing the flames - In the case of rescuing persons from a house which has taken fire in the lower stories it can be run up so close to a window as to afford as much facility in descending as common stair steps.

Witnesses
Wm P. Elliot
Chs. M. Keller

Jas. Johnson -

[illegible]

(Patented [illegible])

[illegible]